United States Patent
Sharma

(10) Patent No.: US 8,656,367 B1
(45) Date of Patent: Feb. 18, 2014

(54) PROFILING STORED PROCEDURES

(75) Inventor: Rakesh Sharma, Redwood City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 286 days.

(21) Appl. No.: 13/179,796

(22) Filed: Jul. 11, 2011

(51) Int. Cl.
- G06F 9/44 (2006.01)
- G06F 7/00 (2006.01)
- G06F 11/00 (2006.01)

(52) U.S. Cl.
USPC ........... 717/130; 717/124; 707/702; 714/38.1

(58) Field of Classification Search
USPC ............. 717/124–135; 707/702; 714/37, 38.1
See application file for complete search history.

(56) References Cited

U.S. PATENT DOCUMENTS

| | | | |
|---|---|---|---|
| 6,816,874 B1* | 11/2004 | Cotner et al. | 707/769 |
| 7,406,679 B2* | 7/2008 | Nelin et al. | 717/130 |
| 7,975,258 B2* | 7/2011 | Nelin et al. | 717/124 |
| 2003/0212986 A1* | 11/2003 | Nelin et al. | 717/124 |
| 2004/0194063 A1* | 9/2004 | Pereira | 717/124 |
| 2005/0022196 A1* | 1/2005 | Davis et al. | 718/100 |
| 2005/0273667 A1* | 12/2005 | Shrivastava et al. | 714/38 |
| 2006/0069682 A1* | 3/2006 | Fanous et al. | 707/8 |
| 2006/0212428 A1* | 9/2006 | Nelson | 707/3 |
| 2007/0094669 A1* | 4/2007 | Rector et al. | 718/104 |
| 2007/0282837 A1* | 12/2007 | Klein | 707/7 |
| 2008/0256126 A1* | 10/2008 | Nelin et al. | 707/103 Y |
| 2009/0254821 A1* | 10/2009 | Cates | 715/700 |

OTHER PUBLICATIONS

Kiczales et al., "An Overview of AspectJ," 2001.*
Lakshman, Bulusu, "Using Java Database Connectivity (JDBC) with Oracle," <http://www.informit.com/articles/article.aspx?p=26251&seqNum=6>, Apr. 5, 2002, p. 1-4.*
Meier et al., "How to: Use SQL Profiler," <http://msdn.microsoft.com/en-us/library/ff650699.aspx>, May 2004, Microsoft Corporation, p. 1-17.*
Wand et al., "A Semantics for Advice and Dynamic Join Points in Aspect-Oriented Programming," Sep. 2004, ACM, p. 890-910.*
Chu, Cliff, "SQL stored procedure profiling in DB2 Developer Workbench," <http://www.ibm.com/developerworks/data/library/techarticle/dm-0710chu/>, Oct. 4, 2007, IBM, p. 1-14.*
Depesz, "Profiling stored procedures/functions," <http://www.depesz.com/2010/03/18/profiling-stored-proceduresfunctions/>, Mar. 18, 2010, p. 1-15.*

* cited by examiner

*Primary Examiner* — Qing Chen
(74) *Attorney, Agent, or Firm* — David R. Stevens; Stevens Law Group

(57) ABSTRACT

An improved system and method for profiling elements of software applications facilitates identification and diagnosis of performance issues. Using aspect-oriented programming, additional code, referred to as an advice, is added at various steps in execution of a stored procedure. The additional code specifies additional action to be taken, such as capture of a stored procedure signature, parameters, and system time before and after execution. By adding the code at load time, the system of the present invention provides a mechanism by which the original procedure code as stored in the database and the application code calling the stored procedure can remain unchanged. Captured data is used in generating a profile of the stored procedure call.

30 Claims, 6 Drawing Sheets

PROFILING STORED PROCEDURES

FIELD OF THE INVENTION

The present invention relates to systems and methods for performing diagnostics on software applications running on computing systems, more particularly to techniques for profiling database stored procedures so as enable identification of problems.

DESCRIPTION OF THE RELATED ART

When performance of a software application deteriorates for unknown reasons, identification and diagnosis of the problem can be a challenging undertaking. Software applications are increasingly complex and multifaceted, with many interrelated components, functions, and modules that can behave differently depending on input parameters, operating conditions, network characteristics, and other factors. Testing of software applications using sample data and other conventional mechanisms may be ineffective, particularly if the performance problem cannot be replicated.

In general, software application solutions often include two types of concerns: core concerns, which are the main issues the software is written to address; and cross-cutting concerns, which are aspects of a software application which may potentially affect (crosscut) other concerns. Cross-cutting concerns are, in general, not unique to any particular software application, but cut across a number of software applications within a particular system; they are often referred to as system-level concerns or secondary concerns.

One source of complexity for modern software application development is that cross-cutting concerns often are commingled with core concerns within the software code. Identification of performance issues is made more difficult by the difficulty in distinguishing between the two types of concerns. For example, a cross-cutting concern may be a login authentication mechanism, which may affect many different areas of software code within a system. Making changes to such a mechanism may be a challenging task because the changes can have unanticipated effects; separating out the cross-cutting code from core code can be difficult.

Software applications can be modified so that they output diagnostic information, such as logs indicating input/output parameters and results as well as time of execution and other operating characteristics. However, such modifications may not be feasible when the application includes many different procedures that interact with one another. The various procedures may contain a multitude of business logic components, so that the addition of diagnostic code can be exceedingly complex, and can cause additional problems with operation of the business logic components. Also, such an approach requires intermingling of diagnostic/logging code with business logic, and such intermingling can have undesirable or even disastrous results.

Such problems can be particularly evident in systems that employ stored procedures for accessing database systems, wherein the logic for the procedure is stored in the database and called as needed.

Conventionally, stored procedure execution can be profiled either by modifying the source code from which calls originate, or by modifying the stored procedure code itself. However, such approaches are problematic, for some or all of following reasons:

Stored procedure calls are often scattered at multiple places, making it impractical to modify the code everywhere.

In many cases, source code containing the originating calls may not be available, particularly when third party libraries are being used and stored procedure calls are originating from these libraries.

For some systems, even if source code is available, modifying the source code may not be a viable option.

Attempts to modify all stored procedure calls to generate profiling information can cause code maintenance issues.

What is needed is a system and method for profiling stored procedures so as to enable the identification and diagnosis of performance problems, in a manner that does not require changes to the existing system. What is further needed is a system and method for profiling stored procedures that can be employed without necessarily having access to source code. What is further needed is a system and method for profiling stored procedures that avoids intermingling of diagnostic/logging code with business logic, and that avoids other problems and limitations of prior art systems.

SUMMARY OF THE INVENTION

In various embodiments, the present invention provides an improved system and method for profiling elements of software applications, so as to identify and diagnose performance issues. According to various embodiments, the system of the present invention provides logging information without intermingling diagnostic code with business logic, and without making changes to the source code. The techniques described herein can be used, for example, for profiling stored procedures for accessing databases. A stored procedure is a subroutine available to applications accessing a relational database system.

In one embodiment, the system and method of the present invention uses an aspect oriented programming (AOP) framework, such as the AspectJ™ aspect-oriented extension for the JAVA programming language, to profile stored procedures associated with a database. Such stored procedures may be called from a JAVA application. Procedure signatures (including the procedure name and the values of parameters being passed in) and execution time for various stored procedures can be generated, stored, and/or output without changing existing code.

AOP is a programming paradigm in which secondary or supporting functions are isolated from the main program's business logic. It aims to increase modularity by allowing the separation of cross-cutting concerns, forming a basis for aspect-oriented software development. Thus, multiple concerns can be expressed separately and can be automatically unified into a working system.

According to various embodiments of the present invention, additional code, referred to as an "advice," is added upon loading of the code making the call to the stored procedure. Adding code in this manner is referred to as "advising," and the code affected by the insertion is referred as the "advised code." The advice specifies additional action to be taken, such as capture of parameters and system time before and after execution. Parameters can be captured even when such parameters are not usually exposed when the execution call to the stored procedure is made. Capture of parameters and execution time allows generation of a profile of the stored procedure, including performance data and other useful information.

By adding the code at load time, the system of the present invention provides a mechanism by which the original procedure code as stored in the database and the code making the stored procedure call can remain unchanged. In fact, advice insertion and procedure profiling can be performed without access to the source code of the system that is making stored procedure calls and without access to the source code of the stored procedure.

By employing AOP, the present invention, in various embodiments, allows the addition of diagnostic/logging functionality without interference with business logic. No changes need be made to the underlying application code itself. The invention can thus be used, for example, as a technique for profiling stored procedure calls being made from a JAVA application to any database using JAVA Database Connectivity (JDBC™). Access to the source code of classes which are making stored procedure calls is not required, as the techniques of the present invention facilitate addition of diagnostic/logging functionality without making any changes to source code. In fact, the JAVA code making calls to store procedures need not even be aware of any profiling code, as the profiling code can be modularized in its own module and woven into classes making stored procedure calls when they are being loaded into the JAVA Virtual Machine (JVM).

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

Figure 1:
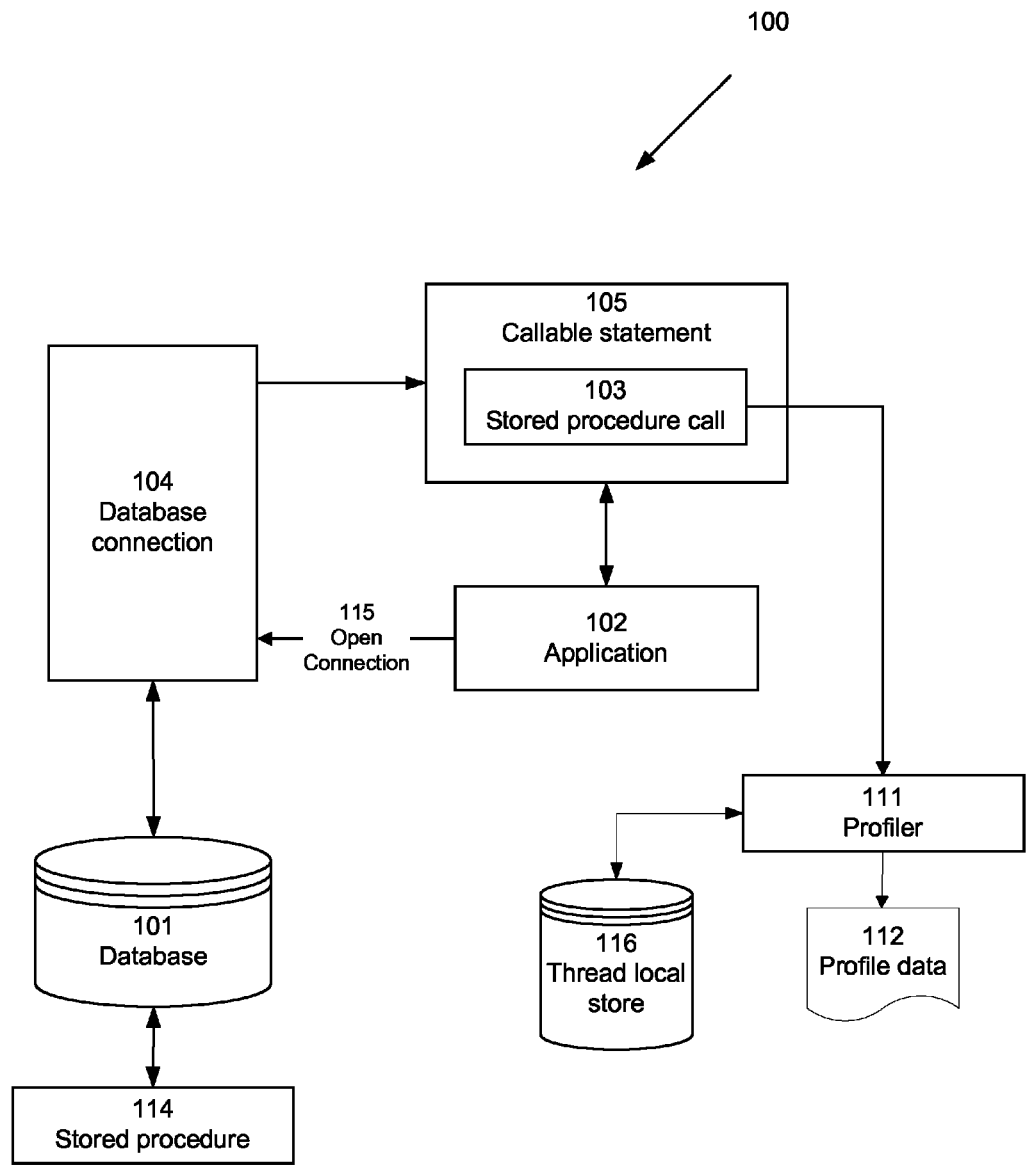
FIG. 1 is a block diagram depicting an example of a conceptual architecture for practicing the invention according to one embodiment.

In one embodiment, the techniques of the present invention are implemented in connection with software application development on a platform such as JAVA Platform, Enterprise Edition (J2EE™) or the like. Although the invention is described in terms of such a platform, one skilled in the art will recognize that the techniques set forth herein can be applied to software development on other platforms and in other contexts. Thus, the mention or description of particular platforms herein are intended to be illustrative and not limiting of the scope of the invention.

TERMINOLOGY

The description provided herein uses the following terms. The definitions and explanations of such terminology are intended to be explanatory and illustrative, but are not intended to restrict or limit the scope of the invention.

Separation of Concerns

Separation of concerns (SoC) is a process by which a computer program is broken down into distinct features that overlap in functionality as little as possible. Each concern represents a piece of interest or focus in a program; concerns often represent features and/or behaviors. Separation of concerns enhances loose coupling, reusability, and maintainability of software.

In the art of computer software engineering, modularity and encapsulation are often used to improve separation of concerns. Layered designs in information systems are also often based on separation of concerns; for example, a software application may include several layers, such as a presentation layer, business logic layer, data access layer, database layer, and the like.

Cross-Cutting Concerns

Cross-cutting concerns are aspects of a software application which may potentially affect (crosscut) other concerns. Such a concern may be a behavior and/or data used across the scope of an application. For example, in a software application for handling medical records, bookkeeping and indexing of such records might be a core concern, while logging a history of changes to a record database or user database, or an authentication system, would be a cross-cutting concern since it would affect other parts of the software application. Cross-cutting concerns often express secondary characteristics of classes that are common with other classes in an object-oriented model. In general, transaction management and logging are typical examples of crosscutting concerns in J2EE™ applications.

Aspect-Oriented Programming (AOP)

Aspect-oriented programming (AOP) is a programming paradigm that increases modularity by enabling improved separation of concerns and by allowing developers to express modular cross-cutting concerns in their software. Such cross-cutting concerns may include constraints that are characteristic of the software, and/or behaviors that every class (or some subset of classes) must perform. One implementation of AOP is AspectJ™, an aspect-oriented extension for the JAVA programming language. AspectJ™ extends JAVA by adding new keywords, and by providing a compiler (AspectJ™ compiler, or AJC™) that understands these extensions. AspectJ™ also offers an alternative syntax based on the JAVA annotations to express crosscutting constructs, allowing for the use of an ordinary JAVA compiler instead of the AJC compiler.

Aspect

An aspect is a modularized representation of a cross-cutting concern. In AspectJ™ AOP, aspects are implemented using aspect classes (also known as traditional style) or regular classes annotated with the @Aspect annotation (@AspectJ™ style).

Join Point

A join point is a point in the control flow of a program, such as the execution of a method or handling of an exception. A join point is a specification indicating a point, in the corresponding main program, where the aspect code should be executed.

Advice

An advice is an action taken by an aspect at a particular join point. An advice can be any of a number of different types, including:

Before advice: An advice to be executed before a join point (such as a method invocation), but which does not have the ability to prevent execution flow from proceeding to the join point (unless the advice throws an exception).

After returning advice: An advice to be executed after a join point completes normally, for example, if a method returns without throwing an exception.

After throwing advice: An advice to be executed if a method exits by throwing an exception.

After (finally) advice: An advice to be executed regardless of the means by which a join point exits (normally or by throwing an exception).

Around advice: An advice that surrounds a join point. An around advice can perform custom behavior before and after a join point. It is also responsible for choosing whether to proceed to the join point or to shortcut the join point execution by returning its own return value or throwing an exception.

Aspects can be linked with other application types and/or objects to create an advised object, by a process called weaving. Weaving can be done at compile time (using the AspectJ™ compiler, for example), load time (using JAVA 1.5 agents), or at runtime. For example, in AspectJ™, build-time weaving weaves aspects into classes during build time. Build time weaving can be performed either on the source code or on the compiled binary JAVA classes. Load-time weaving, or LTW, allows just-in-time weaving of aspects into classes as they are being loaded by the JVM. To support this, one or more weaving class loaders, provided explicitly by the runtime environment or enabled through a weaving agent, are used. The AspectJ™ load-time weaver uses the JAVA 1.5 Virtual Machine Tools Interface (JVMTI) feature.

In one embodiment, insertion of an advice is performed according to well known methods. For example, an agent, such as JAVAAgent, can specify that the JAVA Virtual Machine (JVM) inform the agent when a class is being loaded, so that the agent can determine whether any modifications or insertions need to be performed with respect to the loaded class. The agent inserts any advices as specified. In this manner, the advices are inserted at runtime, leaving stored versions unchanged.

Adding code in this manner is referred to as "advising," and the code affected by the insertion is referred as the "advised code."

Pointcut

A pointcut is a set of join points, which can be specified in terms of a predicate that matches join points. An advice can be associated with a pointcut expression, so that the advice will run at any join point matched by the pointcut. One example is the execution of a method with a certain name. Programming environments such as AspectJ™ provide a language for specifying pointcut expressions.

System Architecture

According to various embodiments, the present invention can be implemented on any electronic device or electronic network comprising any number of electronic devices. Each such electronic device may be, for example, a desktop computer, laptop computer, server computer, personal digital assistant (PDA), cellular telephone, smartphone, music player, handheld computer, tablet computer, kiosk, game system, or the like. An electronic network enabling communication among two or more electronic devices may be implemented using well-known network protocols such as Hypertext Transfer Protocol (HTTP), Secure Hypertext Transfer Protocol (SHTTP), Transmission Control Protocol/Internet Protocol (TCP/IP), and/or the like. Such a network may be, for example, the Internet or an Intranet. Secure access to the network may be facilitated via well known techniques such as a Virtual Private Network (VPN).

In one embodiment, the present invention is implemented as software running on a computing device. In another embodiment, the present invention is implemented as software running in a client/server environment comprising at least one server and at least one client machine. Alternatively, the techniques described herein can be implemented on any other type of computing device, combination of devices, or platform.

Figure 4:
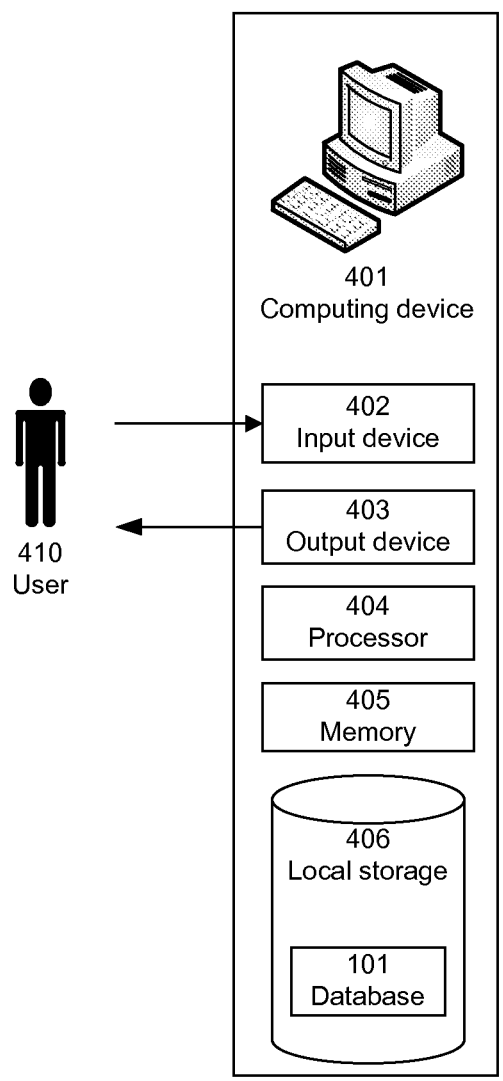
FIG. 4 is a block diagram depicting an example of an architecture for practicing the invention in a stand-alone computing environment, according to one embodiment.

Referring now to FIG. 4, there is shown a block diagram depicting a hardware architecture for practicing the present invention according to one embodiment. Such an architecture can be used, for example, for implementing the techniques of the present invention in connection with software running on a computer. Computing device 401 may be any electronic device adapted to run software; for example, computing device 401 may be a desktop computer, laptop computer, server computer, personal digital assistant (PDA), cellular telephone, smartphone, music player, handheld computer, tablet computer, kiosk, game system, or the like. In one embodiment, computing device 401 is a desktop computer running an operating system such as MICROSOFT WINDOWS, available from MICROSOFT Corporation of Redmond, Wash., or MAC OS X™, available from APPLE Inc. of Cupertino, Calif., or iOS™, available from APPLE Inc. of Cupertino, Calif., or LINUX. In one embodiment, the system of the present invention operates in connection with any known database implementation such as Oracle.

The techniques of the present invention can be implemented as software running on computing device 401 according to well-known techniques. The software may be a desktop application or a web-based application that is accessible via a browser such as MICROSOFT INTERNET EXPLORER, available from MICROSOFT Corporation of Redmond, Wash., or by a specialized web-based client application.

In one embodiment, computing device 401 comprises a number of hardware components as are well known to those skilled in the art. Input device 402 can be a keyboard, mouse, touchscreen, trackball, trackpad, five-way switch, voice input device, joystick, and/or any combination thereof, for accepting input from user 410. Output device 403 can be a screen, speaker, printer, and/or any combination thereof, for presenting output to user 410, including for example reports as to execution time and other information concerning performance of stored procedures. Processor 404 can be a conventional microprocessor for performing operations on data under the direction of software, according to well-known techniques. Memory 405 can be random-access memory having a structure and architecture as are known in the art, for use by processor 404 in the course of running software. Local storage 406 can be any magnetic, optical, and/or electrical storage device for storage of data in digital form; examples include flash memory, magnetic hard drive, CD-ROM, and/or the like. In one embodiment, local storage 406 includes database 101 containing stored procedures whose execution can be profiled according to the techniques of the present invention.

One skilled in the art will recognize that the particular arrangement of hardware elements shown in FIG. 4 is merely exemplary, and that invention can be implemented using different hardware elements configured in any of a number of different ways. Thus, the particular architecture shown in FIG. 4 is merely illustrative and is not intended to limit the scope of the invention in any way.

Figure 5:
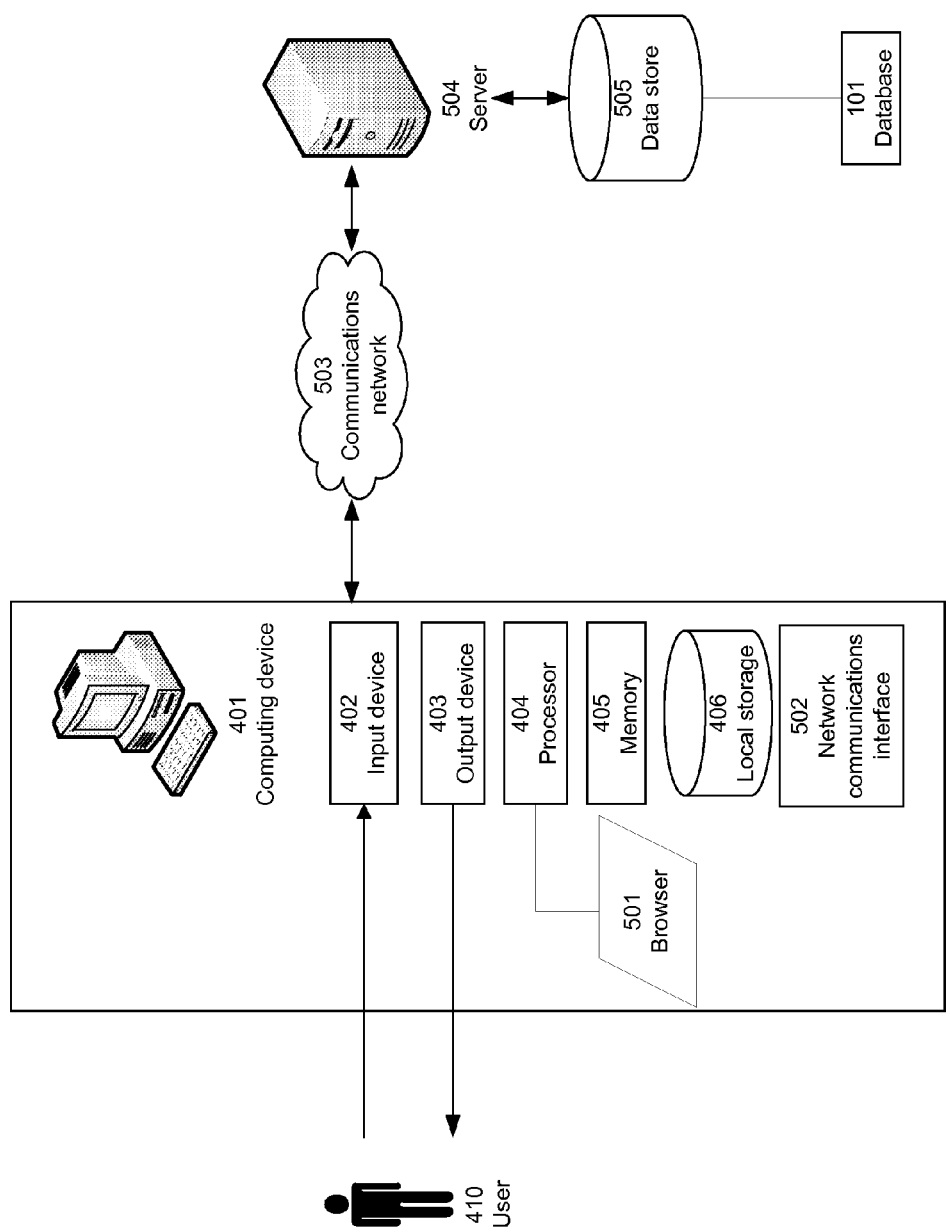
FIG. 5 is a block diagram depicting an example of an architecture for practicing the invention in a client/server computing environment, according to one embodiment.

Referring now to FIG. 5, there is shown a block diagram depicting a hardware architecture for practicing the present invention in a client/server environment according to one embodiment of the present invention. Processor 404 runs browser 501 software according to well-known mechanisms. Browser 501 may be any conventional browser, such as MICROSOFT INTERNET EXPLORER, available from MICROSOFT Corporation of Redmond, Wash. In one embodiment, browser 501 may be an interface for interacting with server 504; in other embodiments, other mechanisms for interfacing with server 504 may be provided. In one embodiment, server 504 runs the application calling the stored procedure.

Network communications interface 502 is an electronic component that facilitates communication of data to and from other computing devices over communications network 503. Communications network 503 can be the Internet or any other electronic communications network.

Server 504 communicates with computing device 401 over network 503, and in one embodiment can be located remotely or locally with respect to computing device 401. In one embodiment, server 504 is associated with data store 505, which includes database 101 containing stored procedures whose execution is to be profiled according to the techniques of the present invention. Database 101 can be located at server 504 or at computing device 401. In one embodiment, database 101 (or some portion thereof) can be transmitted to computing device 401 as part of a client/server session, to improve responsiveness while user 410 interacts with computing device 401.

In one embodiment, in response to requests from computing device 401, server 504 transmits web pages to computing device 401 over network 503. Any or all of such web pages may contain code, such as JAVAScript code for execution on computing device 401, for implementing the techniques of the present invention via browser 501. Alternatively, the software code for implementing the techniques of the present invention may reside at computing device 401. One skilled in the art will recognize that the present invention may be implemented using a distributed software architecture if appropriate. One skilled in the art will further recognize that the client/server architecture shown in FIG. 5 is merely exemplary, and that other architectures can be used to implement the present invention, including architectures that are not necessarily web-based. Thus, the particular architecture shown in FIG. 5 is merely illustrative and is not intended to limit the scope of the invention in any way.

One skilled in the art will recognize that the particular arrangement of hardware elements shown in the Figures is merely exemplary, and that invention can be implemented using different hardware elements configured in any of a number of different ways.

In one embodiment, the system of the present invention is implemented in an object-oriented programming environment. As is well known in object-oriented programming, any number of objects can be defined in terms of object classes, which may inherit properties from one another according to defined hierarchies. Each object is a data structure that may include data fields and methods. Methods can be specified to operate in connection with any number of parameters, including, for example:

IN parameters: for providing information to the method;
OUT parameters: for use by the method in returning information to the calling program;
IN/OUT parameters: passed to the method and modified by the method code; the method uses the same parameter to return its result.

In one embodiment, the system of the present invention provides a mechanism for profiling stored procedure calls. In a stored procedure call, the code for performing the desired operation in connection with database data is defined in the database itself. A software application (written, for example, in JAVA code) makes a call to the stored procedure, but does not generally have the source code for the stored procedure, and does not generally have any information about the operation of the stored procedure. Accordingly, in one embodiment, the system of the present invention provides mechanisms for profiling a stored procedure without necessarily knowing the details of operation of the stored procedure and without necessarily having access to the source code of the stored procedure or to the source code of the application invoking the stored procedure. For example, the system of the present invention can determine execution time and can also capture values for parameters passed to the stored procedure. A report including such information can then be generated and output. Users can use such reports to identify bottlenecks, problems, and other performance issues.

The use of aspect-oriented programming in the present invention allows diagnostics to be performed on stored procedure calls without making changes to the stored code, and without necessarily having access to the application source code that is invoking the stored procedure. When a JAVA class making a stored procedure call is loaded for execution (for example in a JAVA Virtual Machine, or JVM), the binary code of the class is modified based on specified join points and advices, as described in more detail below, to perform information capturing operations that can be used for diagnostics and profiling. The insertion of the profiling code can take place in advance (before the code is loaded into the JVM) or at the time the binary classes are loaded into memory for execution by the JVM, or at any other suitable time. In this manner, the underlying stored procedure code or JAVA code calling the stored procedure need not be modified, and the original stored versions of the stored procedure code and/or JAVA code of both of them can remain unchanged on disk.

Method

In JDBC™ stored procedure execution, the following JAVA method calls may be involved:

Java.sql.Connection.prepareCall( ) call to pass the stored procedure signature
Multiple Java.sql.CallableStatement.setXXX( ) calls to pass indices and values of IN and IN/OUT parameters
Java.sql.CallableStatement.execute( ) call to execute the stored procedure The prepareCall call specifies a stored procedure to be called. Parameters are not yet specified, and may be indicated with placeholders such as question marks. One example of such a call might be connection.prepareCall("call tax_calculator(?,?,?,?,?)"); The database returns an instance of the callable statement.

Once the instance of the callable statement has been returned, setXXX calls are invoked in order to set values for IN and IN/OUT parameters. In one embodiment, one parameter is passed at a time. Different setXXX calls may be provided for different types of data; examples include setInt, setDouble, setString, and the like. SetXXX may be called any number of times, depending on how many parameters are being passed.

Once parameters have been passed, execute( ) is invoked to execute the stored procedure. At this time, the system generally does not have access to the parameters, nor to the stored procedure itself. The present invention thus provides a mechanism by which such information can be captured by the use of advices associated with setXXX and prepareCall( ) join points. The data is stored in a location unique to the execution thread, such as ThreadLocal, so that it can be kept separate from stored data for other calls being invoked concurrently. ThreadLocal variables are unique to each individual thread, so that each thread has its own, independently initialized copy of the variable.

In this manner, the system of the present invention allows profile data (such as stored procedure signature, parameters values, and execution time) to be captured and accumulated in a manner that avoids the need to have access to the source code of the stored procedure itself or the application source code invoking the stored procedure.

Referring now to FIG. 1, there is shown a block diagram depicting a conceptual architecture for practicing the present invention according to one embodiment.

According to the techniques of the present invention, stored procedure profiler 111 collects data from each of these calls in a thread-safe way, so that data collected in one thread is not impacted by data being collected in other threads. The collected information is combined together to produce profile data 112 of a stored procedure call 103. Multiple stored procedure calls 103 from a JAVA Virtual Machine (JVM) can take place simultaneously. According to one embodiment, profiler 111 stores procedure-specific data in a thread local store 116, and clears it once stored procedure execution has completed. This approach enables collection of stored procedure-specific data separately from data for other stored procedure calls taking place at the same time.

Profiler 111 can be a distinct software application running on computing device 401, or it can be a component of another software application; for example profiler 111 can be implemented as a component of an application for evaluating performance of software applications and generating diagnostic reports.

JDBC™ allows a JAVA application 102 to call a database stored procedure. Application 102 establishes a connection to database 101. It can either create a new connection, using a driver manager provided by JDBC™, or it can obtain one from an existing connection pool. A callable statement 105 is created by passing the stored procedure signature to the connection object.

Callable statement object 105 contains a call 103 to a stored procedure 114 in database 101; it does not contain the stored procedure 114 itself. Stored procedure calls 103 can have any number of parameters used for input (IN parameters), output (OUT parameters), or both (IN/OUT parameters). In one embodiment, a question mark is used as a placeholder for a parameter value.

Values are passed to callable statement object 105 via IN and IN/OUT parameters. In one embodiment, a setXXX(...) call can be used for passing a value to callable statement object 105, where the type of the value being passed in determines which setXXX(..) method to use; for example, setInt (..) can be used to pass in a integer value, while setString(..) can be used to pass in a string, and the like.

Figure 3:
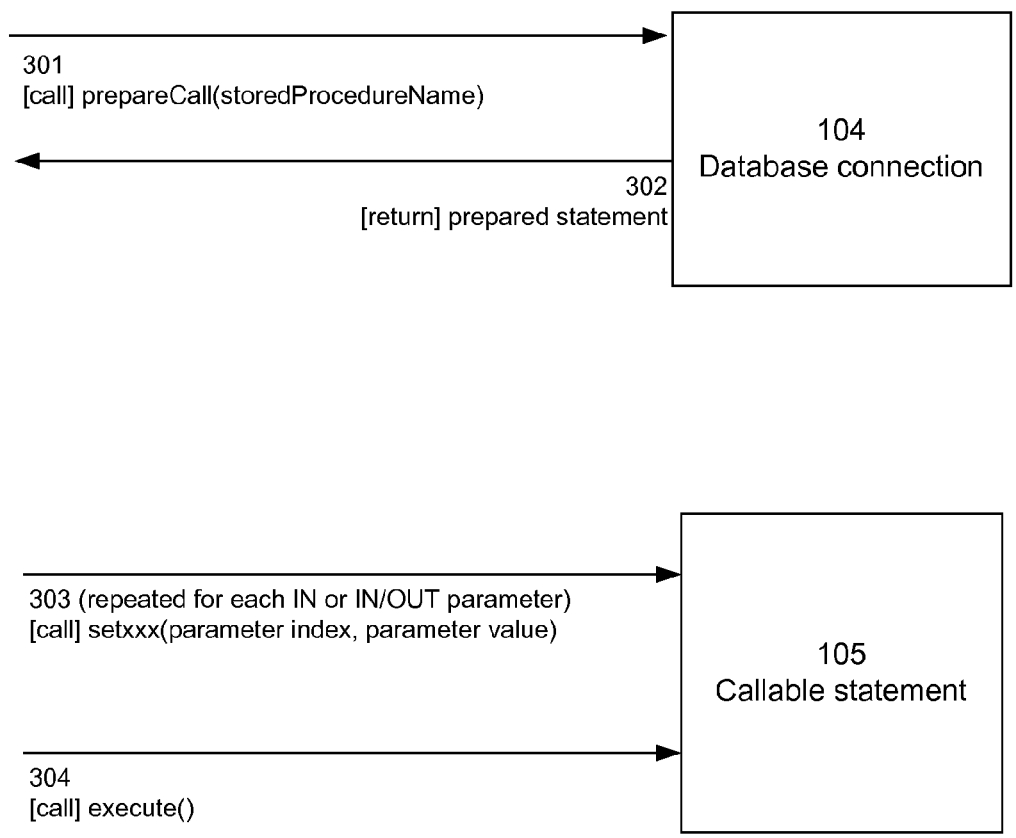
FIG. 3 is a block diagram depicting a series of steps for preparing and executing a procedure call according to one embodiment.

Referring now to FIG. 3, there is shown a series of steps for preparing and executing a procedure call via JDBC™ according to one embodiment. Connection 104 to database 101 is established. Then, prepareCall( ) 301 is invoked, to create a callable statement object 105. In one embodiment, prepareCall( ) 301 provides, to database connection 104, a stored procedure signature (such as a stored procedure name along with placeholders for parameters); question mark parameters placeholders are used as part of the signature. Connection 104 responds by returning 302 a prepared statement for setting the parameter values and invoking the stored procedure.

Once the call has been prepared, the values of IN and/or IN/OUT parameters are passed to callable statement 105, for example by calling setXXX(..) methods 303. This can be performed multiple times, if multiple parameters are to be passed. Once all parameters have been passed to callable statement 105, the stored procedure 114 is executed, for example, by invoking an execute( ) method 304 of callable statement 105.

Profiler 111 profiles stored procedure call 103 by gathering the following information:
    Name of stored procedure 103
    IN and IN/OUT parameter values
    System time before and after execution of stored procedure; this allows calculation of execution time by subtraction In one embodiment, OUT parameters are not captured, since those values will be populated by the database upon execution of the store procedure.

As described in more detail below, the gathered information is, in one embodiment, accumulated in a hash table for later use in generating a profile of the stored procedure.

Figure 2A:
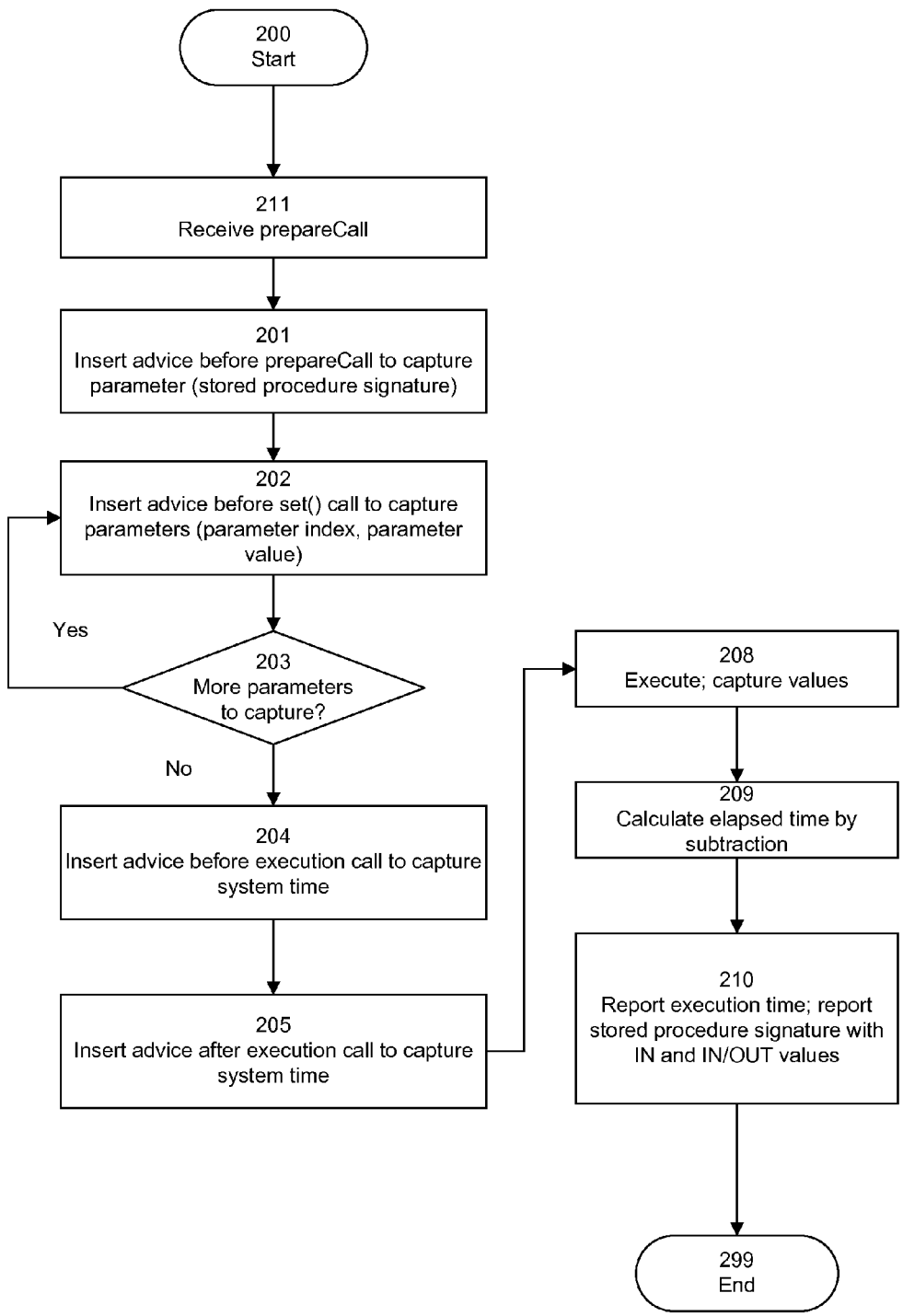
FIG. 2A is a flow diagram depicting a method for profiling a stored procedure according to one embodiment.

Referring now to FIG. 2A, there is shown a flow diagram depicting a method for profiling a stored procedure according to one embodiment. In one embodiment, the steps of FIG. 2A are performed by profiler 111. One skilled in the art will recognize, however, that the steps can be performed by any component for collecting and reporting on information concerning execution of stored procedures. For illustrative purposes, the steps of FIG. 2A are described in terms of the steps for preparing and executing a procedure call via JDBC™.

The method begins 200. Application 102 executes 211 a prepareCall( ) on a connection object to initiate a call to a stored procedure 114. Upon receiving the prepareCall( ) call, a before advice (which was woven by the aspect before execution of the prepareCall( )), captures 201 the signature for stored procedure 114, and stores the signature in ThreadLocal store 116.

Profiler 111 inserts 202 an advice before the setXXX( ) call 303 (which may be setInt( ), setString( ), or the like), to capture an IN or IN/OUT parameter. Step 202 can be performed any number of times, such as for example once for each parameter to be captured. Each time step 202 is performed, a determination 203 is made as to whether there are more parameters to be captured; if so, step 202 is repeated. The advice inserted each time step 202 is performed is a before advice, which will be executed prior to invocation of a particular setXXX( ) method 303. As discussed above, in one embodiment a separate setXXX( ) call 303 may be provided for each IN or IN/OUT parameter.

Once step 203 indicates that no more parameters are to be captured, profiler 111 proceeds to steps 204 and 205, where advices to capture system time are inserted before and after the execute( ) call 304. By capturing system time before and after the execute( ) call 304, profiler 111 is able to determine the execution time of the stored procedure 114 using subtraction.

Callable statement 105 is then executed 208, via execute( ) call 304. The inserted advices cause values to be captured (including the procedure name, parameters, and system time before and after execution). Elapsed time is calculated 209 by subtracting the system time before execution from the system time after execution; this elapsed time represents the execution time of the stored procedure.

Profiler 111 then reports 210 the information it has collected, including the execution time, stored procedure name, and/or IN and IN/OUT parameter values. In one embodiment, such information is reported 210 by generating a report for output to user 410 via output device 403. The report can be stored, transmitted, and/or output according to any known storage, transmission, and/or output means. The method then ends 299.

Figure 2B:
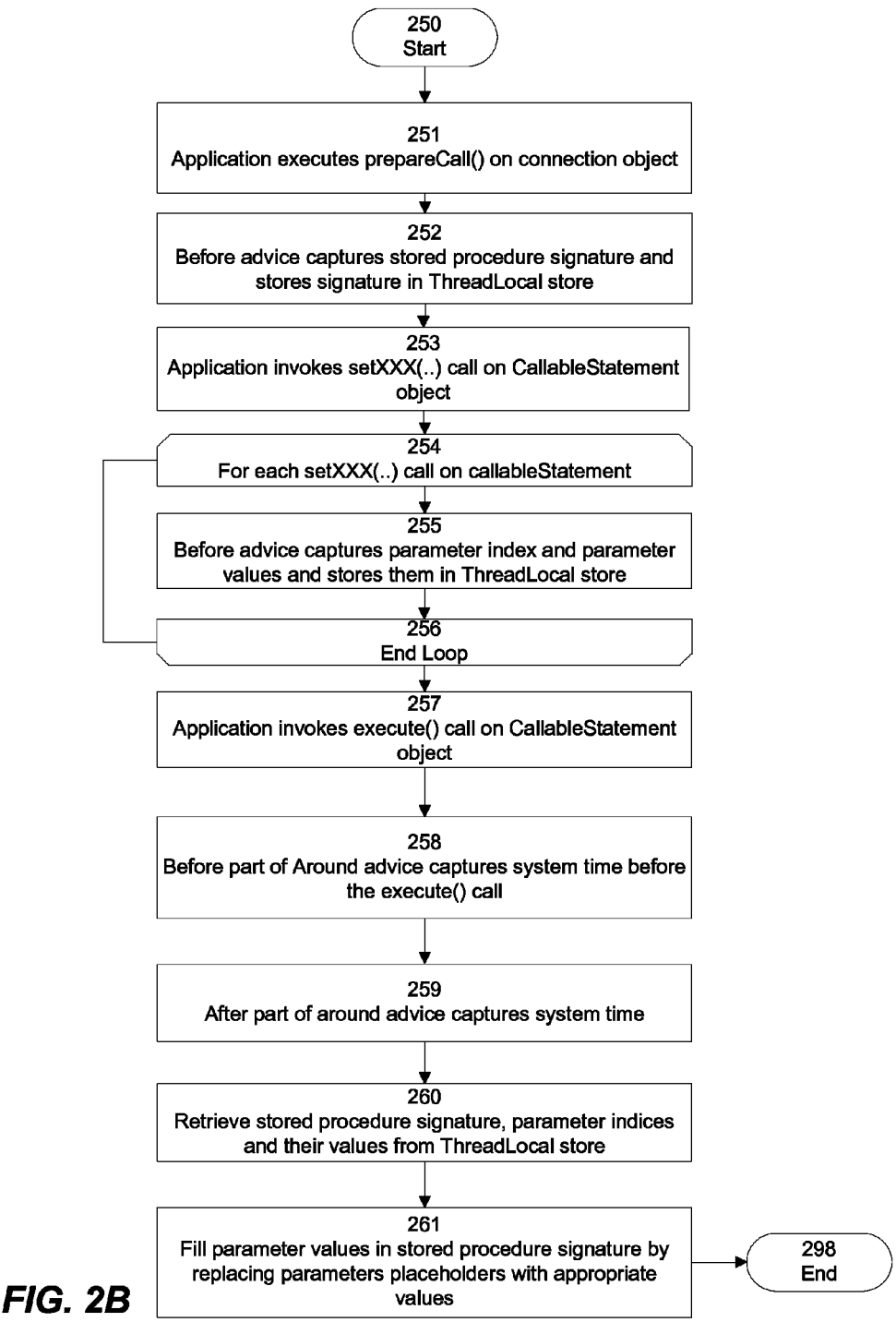
FIG. 2B is a flow diagram depicting additional details for capturing values associated with the stored procedure being profiled, according to one embodiment.

Referring now to FIG. 2B, there is shown a flow diagram depicting additional details that may be performed in connection with step 208 of FIG. 2A, wherein advices are performed to capture values associated with the stored procedure, according to one embodiment.

The method begins 250. The application executes 251 prepareCall( ) on the connection object. The before advice (which was inserted in step 202, above), captures 252 the stored procedure signature and stores the signature in a location unique to the execution thread, such as ThreadLocal.

Application 102 invokes 253 the callableStatement.setXXX(..) method. Next, a loop 254-256 is performed. For each setXXX(..) call on callableStatement, before advice, on join point callableStatement.setXXX(..) method, is executed. This advice captures 255 the index and value of IN and IN-OUT parameters, and stores the index and parameters in the ThreadLocal location. In one embodiment, this process is repeated for every callableStatement.setXXX(..) method invoked by the application. As discussed above, in one embodiment a separate setXXX( ) call may be provided for each IN or IN/OUT parameter.

Once parameters have been captured, application 102 invokes 257 execute( ) method on callableStatement object. An around advice is executed before and after the execution of callableStatement.execute( ); the around advice thus has a "before" part and an "after" part. The before part captures 258 the system time before execution of callableStatement.execute( ) method. Then, once stored procedure 114 has been executed, the after part captures 259 the system time again. By capturing system time before and after the execute( ) call, profiler 111 is able to determine the execution time of the stored procedure 114 using subtraction.

The after part of around advice also retrieves 260 the stored procedure signature, parameter indices, and their values from the ThreadLocal store. Parameter values in the stored procedure signature are filled 261 by replacing parameters placeholders with appropriate values. The method then ends 298.

EXAMPLE

The following example is provided for illustrative purposes only. One skilled in the art will recognize that the particular steps and names are merely exemplary. The example will be described in terms of a call 103 to a stored procedure 114 named get_employee_id(?, ?, ?), which takes a first and last name of an employee as IN parameters and returns an employee Id as an OUT parameter. The question marks are included in the procedure call 103 as placeholders for IN and OUT parameters.

As described above, in order to execute a stored procedure 114 such as get_employee_id( ) using JDBC™, a callable statement object 105 is created. In one embodiment, callable statement object 105 is created by calling prepareCall( ) method 301 on the connection object. Thus, for the get_employee_id( ) procedure 114, in which "connection" is an active JDBC™ Connection object, the following JDBC™ code would create an instance of the callable statement object 105:

CallableStatement cstmt=connection.prepareCall ( "{call get_employee_id(?, ?, ?)}");

Capturing Stored Procedure Name.

The variable cstmt contains a call to the stored procedure 114 get_employee_id( ), which has two input parameters and one output parameter. The name of the stored procedure is being passed (together with question mark placeholders for IN, IN-OUT, and OUT parameters) to prepareCall( ) method 301. As described above, the signature, including procedure name and parameters, of stored procedure 114 can be captured by inserting 201 a before advice for prepareCall( ) method 301.

A join point is established and before advice is woven prior to execution of prepareCall( ) method 301, to capture the stored procedure 114 signature. In one embodiment, the join point is established with reference to a pointcut. For example:

@Pointcut("execution(public * java.sql.Connection.prepareCall(..))") public void prepare( ){}

Next, profiler 111 introduces a before advice at the established join point. This before advice will be used to intercept the stored procedure signature which is passed as a parameter to connection.prepareCall( ) method. The signature parameter includes the stored procedure name, along with parameter placeholders. For example:

@Before("prepare( )")
public void interceptStoredProcedureSignature(Joinpoint jp)
throws Throwable{
    // Capture stored procedure signature from the JointPoint instance and store it
    // in a ThreadLocal object instance
}

Thus, according to the above example, "{call get_employee_id(?, ?, ?)}" will be stored in a ThreadLocal instance. In one embodiment, ThreadLocal instance is used, so as to avoid mixing up one stored procedure signature with another when multiple stored procedures are being executed concurrently.

Capturing Parameter Values.

As described above, in one embodiment IN and IN/OUT parameter values are set by calling setXXX( ) methods 303 on callable statement object 105. In the current example, IN parameters include first and last names of the employees. Thus, the values of these IN parameters are set by calling the following two methods:

| callableStatement.setString(1, "John"); | //Setting first name |
| callableStatement.setString(2, "Smith"); | //Setting last name |

In this example, the parameter values are strings; therefore, the setString(..) method is used. The first argument is the parameter index (the position of the parameter placeholder "?"). The second argument is the actual value of the parameter being passed in.

The method of the present invention captures both the value and the index by introducing a before advice. A join point is established and a before advice is woven that gets executed prior to the execution of setXXX( ) method 303 (in this case, setString(..) method). In one embodiment, the join point is established with reference to a pointcut. For example:

@Pointcut("execution(public * java.sql.CallableStatement.set*(..))") public void paramSetter( ){}

The use of "set*" indicates that the join point should be established for all setXXX(..) methods of CallableStatement instances, thus ensuring that data will be captured for all methods that pass parameters, regardless of the type of parameter being passed. Upon execution, the advice captures parameters indices and their values. The captured indices and values are populated in a hash table and stored in the ThreadLocal store, as described below.

Next, profiler 111 introduces a before advice at the established join point. This before advice will be used to collect the parameters indices and their values being passed to cstmt.setXXX( ) methods. The first parameter has the index of the parameter and second parameter has the value of the parameter being passed to the stored procedure. For example:

```
@Before("paramSetter( )")
public void interceptParameterIndexAndValue(Joinpoint jp) throws
Throwable {
    // Capture stored procedure index and value and put them
    in ThreadLocal
    // HashMap using parameter index as key for the HashMap
}
```

In this example, the advice will collect the parameter indices and their values in a hash table that is stored in memory local to the current thread: referred to as a ThreadLocal HashMap instance. The values of parameter indices will be used as keys to the HashMap. Continuing with the same example, the method calls:

```
callableStatement.setString(1, "John");   //Setting first name
callableStatement.setString(2, "Smith");  //Setting last name
``` will result in the following keys and values being captured in the ThreadLocal HashMap:

| Keys | Values |
|------|--------|
| 1    | John   |
| 2    | Smith  |

The HashMap thus provides a mechanism for storing parameters that are to be passed to the stored procedure. The first column indicates which parameter is being stored (numbered consecutively), and the second column indicates the value for the parameter.

Null parameter values are set by calling setNull( ) method on callable statement. In one embodiment, a "null" literal string is stored as value of the parameter if parameter value is null, for example if it was set using setter method setNull(..) on callable statement object.

In one embodiment, a JAVA class (StoredProcInfo.Java) is created to encapsulate stored procedure signature, parameter values, and their indices. In one embodiment, parameter indices and their values are stored in a hash map. For example:

```
import Java.util.HashMap;
public class StoredProcInfo{
    // Name of the stored procedure being called
    private String storedProcName = null;
    // Parameter values and their indices(as key) are being
    stored in the HashMap
    private HashMap<Integer, String> storedProcParams = new
HashMap<Integer, String>( );
    public StoredProcInfo( ){
    }
    public void setStoredProcName(String procName){
        storedProcName = procName;
    }
    public void addParam(int index, String value){
        storedProcParams.put(new Integer(index), value);
```

```
    }
    public String getStoredProcName( ){
        return storedProcName;
    }
    public HashMap<Integer, String> getStoredProcParams( ){
        return storedProcParams;
    }
    public void clear( ){
        storedProcName = null;
        storedProcParams.clear( );
    }
}
```

In one embodiment, a ThreadLocal wrapper class (ThreadLocalStoredProcInfo) can be created to hold an instance of StoredProcInfo. For example:

```
public class ThreadLocalStoredProcInfo {
    private static ThreadLocal threadLocal = new ThreadLocal( ) {
        protected synchronized Object initialValue( ) {
            return new StoredProcInfo( );
        }
    };
    public static StoredProcInfo get( ) {
        return (StoredProcInfo)threadLocal.get( );
    }
}
```

The use of a ThreadLocal wrapper in this manner ensures that each thread has its own copy of StoredProcInfo to avoid collisions with other threads making stored procedure calls concurrently.

Capturing Stored Procedure Execution Time.

In one embodiment, profiler 111 determines the execution time for stored procedure 114, based on the time taken by the execute( ) method of callable statement 105. As described above, this can be done by determining the system time just before the start of the call and just after the call completes. The difference of these two values corresponds to the execution time of stored procedure 114.

A join point is established and an advice is woven around execute( ) method 301, to capture the system time before and after execution of execute( ) method of callable statement 105. In one embodiment, the join point is established with reference to a pointcut. For example:

```
@Pointcut("execution(public * java.sql.CallableState-
        ment.execute(..))") public void execute( ){ }
```

Next, profiler 111 introduces an around advice at the established join point. This around advice will be used to capture the start and end time of stored procedure execution, and to calculate the total time of execution by subtraction. For example:

```
@Around("execute( )")
public Object profile(ProceedingJoinpoint pjp) throws Throwable {
    long startTime = Calendar.getInstance( ).getTimeInMillis( );
    try{
        return pjp.proceed( );
    } finally {
        long endTime = Calendar.getInstance( ).getTimeInMillis( );
        long totalTime = endTime-startTime
    }
}
```

Example of Advice Class StoredProcedureProfiler

The following is an example of an aspect class for implementing the above-described mechanisms for capturing information regarding the execution of stored procedure 114, including the above-described advices and pointcuts:

```
import org.aspectj.lang.ProceedingJoinpoint;
import org.aspectj.lang.Joinpoint;
import org.aspectj.lang.annotation.Aspect;
import org.aspectj.lang.annotation.Around;
import org.aspectj.lang.annotation.Before;
import org.aspectj.lang.annotation.Pointcut;
import Java.util.HashMap;
import Java.util.Calendar;
@Aspect
public class StoredProcedureProfiler {
    @Around("execute( )")
    public Object profile(ProceedingJoinpoint pjp) throws Throwable {
        long startTime = Calendar.getInstance( ).getTimeInMillis( );
        StoredProcInfo storedProcInfo = ThreadLocalStoredProcInfo.get( );
        try{
            return pjp.proceed( );
        } finally {
            try{
                boolean noException = true;
                long endTime = Calendar.getInstance( ).getTimeInMillis( );
                if(storedProcInfo.getStoredProcName( ) != null){
                    StringBuffer sb = new StringBuffer(storedProcInfo.getStoredProcName( ));
                    HashMap<Integer, String> params =
(HashMap<Integer, String>)storedProcInfo.getStoredProcParams( );
                    if((params != null) && (!params.isEmpty( ))){
                        for(Integer key: params.keySet( )){
                            String paramValue = (String)params.get(key);
                            int paramIndex = key.intValue( );
                            // Get index of parameter in API based on commas
                            int index = 0;
                            int previousIndex = 0;
                            for(int i= 0; i <paramIndex; i++){
                                previousIndex = index;
                                index = sb.indexOf(",", index+1);
                            }
                            if (index <= 0){
                                index = sb.lastIndexOf("?")+1;
                            }
                            sb.replace(index-1, index, paramValue);
                        }
                        System.err.println("Execution time [" +
(endTime-startTime) + "] ms for API " + sb);
                    }
                }
            }finally{
                storedProcInfo.clear( );
            }
        }
    }
    @Before("paramSetter( )")
    public void interceptParameterIndexAndValue(Joinpoint jp)
throws Throwable {
        Object[ ] args =jp.getArgs( );
        String name = jp.getSignature( ).getName( );
        String paramValue = null;
        String paramIndex = null;
        if(name.equals("setNull")){
            paramValue = "null";
            paramIndex = args[0].toString( );
        }else if((args != null) && (args.length > 1)){
            paramIndex = args[0].toString( );
            if(args[1] != null){
                paramValue = args[1].toString( );
            }else{
                paramValue = "null";
            }
        }
        if((paramIndex != null) && (paramValue != null)){
            Integer index = Integer.valueOf(paramIndex);
            StoredProcInfo storedProcInfo =
ThreadLocalStoredProcInfo.get( );
            storedProcInfo.addParam(index, paramValue);
        }
    }
    @Pointcut("execution(public * java.sql.CallableStatement.set*(. .))")
    public void paramSetter( ){ }
    @Pointcut("execution(public * java.sql.CallableStatement.execute(. .))")
    public void execute( ){ }
    @Pointcut("execution(public * java.sql.Connection.prepareCall(. .))")
    public void prepare( ){ }
}
```

Load Time Weaving

In one embodiment, the advice code for profiling stored procedure 114 is woven into the java classes during load time, for example using Load Time Weaving (LTW) in AspectJ™. LTW is binary weaving that is deferred until a class loader loads the class. The particular LTW mechanism can be specified, for example, through JVM startup options. Configuration files determine the set of aspects to be used for weaving and which types will be woven. AspectJ™ provides a JAVA Virtual Machine Tool Interface (JVMTI) agent that enables LTW. It can be enabled by specifying a -Javaagent:<pathto aspectjweaver.jar> option to JVM.

In one embodiment, a Spring framework is used for AspectJ™ load-time weaving. A context:load-time-weaver configuration element in a Spring context configuration file automatically activates AspectJ™ aspects as defined in AspectJ™'s META-INF/aop.xml descriptor file on the class loader path. These are applied to the current application context, for example by registering a trans-former with the underlying ClassLoader.

An aop.xml file contains at least two sections: aspects defines one or more aspects to the weaver and controls which aspects are to be used in the weaving process; weaver defines weaver options and which types should be woven. In one embodiment, profiling aspects are in class StoredProcedureProfiler.

The following is an example of a configuration file aop.xml to weave the above-described advice class StoredProcedureProfiler:

```
<!DOCTYPE aspectj PUBLIC
"-//AspectJ//DTD//EN"
"http://www.eclipse.org/aspectj/dtd/aspectj.dtd">
<aspectj>
    <aspects>
        <!-- weave in just this aspect -->
        <aspect name="StoredProcedureProfiler"/>
    </aspects>
</aspectj>
```

Application of Profiler to Test Case

The following is an example of the application of the above-described techniques to implement a profiler 111 for profiling a database stored procedure 114. In the following example, an Oracle database and Oracle JDBC™ driver are used.

An employee table is created with the following Data Definition Language (DDL) file:

```
CREATE TABLE employees(employee_id NUMBER PRIMARY KEY,
first_name    VARCHAR(30) NOT NULL,
last_name     VARCHAR(30) NOT NULL);
```

The table can be populated with data, as follows:

```
INSERT INTO employees VALUES(1,'John',
    'Drake')
```

```
INSERT INTO employees VALUES(2,'Steve',
    'King');

INSERT INTO employees VALUES(3,'Charles',
    'Schwab');

INSERT INTO employees VALUES(4,'Larry',
    'Cheng');
```

The following is an example of a stored procedure 114 that might be used to retrieve an employee ID based on the first and last name of an employee:

```
CREATE PROCEDURE get_employee_id(first_name_in VARCHAR2,
    last_name_in VARCHAR2,
    emp_id_out OUT NUMBER) IS
BEGIN
    SELECT employee_id into emp_id_out
    FROM employees
    WHERE first_name = first_name_in
    AND last_name = last_name_in;
END;
```

The following is an example of a utility program (DBUtil.Java) that might be used to make a call to the above stored procedure 114.

```
import Java.sql.DriverManager;
import Java.sql.Connection;
import Java.sql.CallableStatement;
import Java.sql.SQLException;
import Java.sql.Types;
public class DBUtil {
    public static long getEmployeeId(String firstName, String lastName){
        String driver = "oracle.jdbc.driver.OracleDriver";
        String url = "jdbc:oracle:thin:@jackhammer:1521:wmdevd2";
        String userid = "userid";
        String password = "password";
        Connection con = null;
        try {
            Class.forName(driver);
            con = DriverManager.getConnection(url, userid, password);
            CallableStatement cs = con.prepareCall("{call get_employee_id(?, ?, ?)}");
            //set inputs
            cs.setString(1, firstName); //Setting value of first param firstName
            cs.setString(2, lastName); //Setting value of first param firstName
            cs.registerOutParameter(3, Types.INTEGER); // Register out param employee Id
            // execute
            cs.execute( );
            return cs.getLong(3);
        }catch(Exception e){
            throw new RuntimeException(e);
        } finally {
            try {
                con.close( );
            } catch (SQLException e) {
                e.printStackTrace( );
            }
        }
    }
}
```

The following is an example of a test program which calls a DBUtil.getEmployeeId( ) function. This function invokes the stored procedure get_employee_id( ). The test class spawns four threads to simulate multiple concurrent JDBC™ stored procedure calls.

```
public class TestStoredProcProfiler implements Runnable{
    private String firstName;
    private String lastName;
    public TestStoredProcProfiler(String firstName, String lastName){
        this.firstName = firstName;
        this.lastName = lastName;
    }
    public static void main(String[ ] args){
        TestStoredProcProfiler profiler1 = new TestStoredProcProfile("John", "Drake");
        TestStoredProcProfiler profiler2 = new TestStoredProcProfiler("Steve", "King");
        TestStoredProcProfiler profiler3 = new TestStoredProcProfiler("Larry", "Cheng");
        TestStoredProcProfiler profiler4 = new TestStoredProcProfiler("Charles", "Schwab");
        new Thread (profiler1).start( );
        new Thread (profiler2).start( );
        new Thread (profiler3).start( );
        new Thread (profiler4).start( );
    }
    public void run( ){
        long employeeId = DBUtil.getEmployeeId(firstName, lastName);
    }
}
```

The above-described test program generates output, such as the following:

```
Execution time [27] ms for API {call get_employee_id(Larry, Cheng, ?)}

Execution time [26] ms for API {call get_employee_id(Steve, King, ?)}

Execution time [26] ms for API {call get_employee_id(Charles, Schwab, ?)}

Execution time [2] ms for API {call get_employee_id(John, Drake, ?)}
```

In one embodiment, once the profile has been captured, and the report has been generated, the ThreadLocal HashMap is cleared so that it can be used for profiling another stored procedure.

One skilled in the art will recognize that the output of the system of the present invention can take any form, and that the above output is merely exemplary. In particular, output can be textual, graphical, animated, or of any other form, type, or format, and can be presented on any suitable output device, such as a screen, paper, audio output, video output, and/or the like.

As demonstrated by this example, the present invention can be implemented in such a manner that no profiling code need be inserted into the JAVA code. Specifically, in this example, neither DBUtil.Java nor TestStoredProcProfiler.Java classes has any profiling code. Neither of them need even be aware that any calls are being intercepted.

Accordingly, the system and method of the present invention provide mechanisms and techniques for implementing a generic stored procedure profiler that does not require extensive changes to be made to stored procedures, and that can be employed without necessarily having access to source code. Diagnostic/logging code need not be intermingled with business logic.

In one embodiment, the profiler is implemented using AOP features of AspectJ™. The classes which are making JDBC™ calls need not be aware that their JDBC™ calls are being profiled. Hence, no code changes or even source code of these classes is needed.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: LINUX; MICROSOFT WINDOWS, available from MICROSOFT Corporation of Redmond, Wash.; MAC OS X™, available from APPLE Inc. of Cupertino, Calif.; iOS™, available from APPLE Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for profiling a stored procedure, comprising:
   in a processor, receiving an instruction to execute a call preparation function to prepare a call to invoke a stored procedure;
   in the processor, inserting first additional code to the call preparation function operable to capture a call signature of the stored procedure;
   in the processor, receiving an instruction to execute a parameter setting function to set a parameter for the stored procedure;
   in the processor, inserting second additional code to the parameter setting function operable to capture the parameter for the stored procedure;
   in the processor, receiving an instruction to execute a call executing function operable to invoke the stored procedure with the parameter for the stored procedure;
   in the processor, inserting third additional code to the call executing function operable to capture at least one data item concerning the stored procedure;
   in the processor, executing the call preparation function, the parameter setting function, and the call executing function, including executing the first, the second, and the third additional code to capture the call signature, the parameter, and the at least one data item, respectively, concerning the stored procedure;
   in a storage device, storing the captured call signature, the captured parameter, and the captured at least one data item;
   in the processor, determining an association between the captured call signature, the captured parameter, and the captured at least one data item;
   in the processor, generating a report profiling the stored procedure based on the captured call signature, the captured parameter, and the captured at least one data item; and
   in an output device, outputting the generated report.

2. The computer-implemented method of claim 1, wherein:
   the third additional code is configured to cause the processor to capture a system time prior to execution of the stored procedure and a system time after execution of the stored procedure;
   the computer-implemented method further comprises, in the processor, determining an execution time for the stored procedure based on the captured system times before and after execution of the stored procedure; and
   the generated report comprises the determined execution time for the stored procedure.

3. The computer-implemented method of claim 1, wherein inserting the first, the second, and the third additional code comprises inserting advices.

4. The computer-implemented method of claim 3, wherein inserting the advice comprises performing load time weaving to insert the advice.

5. The computer-implemented method of claim 3, wherein inserting the advices comprises:
   establishing join points;
   specifying advice code to run at the join points; and
   specifying when the advice code is to run with regard to execution of the call preparation function, the parameter setting function, and the call executing function.

6. The computer-implemented method of claim 5, wherein specifying advice code to run at a join point of the join points comprises:
   specifying a set of join points for which the advice code should be added;
   determining whether the join point is a member of the specified set of join points; and
   responsive to the join point being a member of the specified set of join points, adding the advice code at the join point.

7. The computer-implemented method of claim 1, wherein the inserted third additional code captures at least one data item concerning a cross-cutting concern associated with the stored procedure.

8. The computer-implemented method of claim 1, wherein determining, in the processor, the association between the captured call signature, the captured parameter, and the captured at least one data item comprises determining that the captured call signature, the captured parameter, and the captured at least one data item are associated with a same thread; and
   wherein executing the call preparation function, the parameter setting function, and the call executing function occurs within the same thread.

9. The computer-implemented method of claim 8, further comprising:
   storing, by the first, the second, and the third additional code, the captured call signature, the captured parameter, and the captured at least one data item, respectively, in a storage location inaccessible to other execution threads.

10. The computer-implemented method of claim 1, wherein storing the captured at least one data item comprises storing the captured at least one data item in a hash table.

11. A system for profiling a stored procedure, comprising:
   a processor, configured to perform the steps of:
      receiving an instruction to execute a call preparation function to prepare a call to invoke a stored procedure;
      inserting first additional code to the call preparation function operable to capture a call signature of the stored procedure;
      receiving an instruction to execute a parameter setting function to set a parameter for the stored procedure;
      inserting second additional code to the parameter setting function operable to capture the parameter for the stored procedure;
      receiving an instruction to execute a call executing function operable to invoke the stored procedure with the parameter for the stored procedure;
      inserting third additional code to the call executing function operable to capture at least one data item concerning the stored procedure;
      executing the call preparation function, the parameter setting function, and the call executing function, including executing the first, the second, and the third additional code to capture the call signature, the parameter, and the at least one data item, respectively, concerning the stored procedure;
      determining an association between the captured call signature, the captured parameter, and the captured at least one data item; and generating a report profiling the stored procedure based on the captured call signature, the captured parameter, and the captured at least one data item;

a storage device, communicatively coupled to the processor, configured to store the captured call signature, the captured parameter, and the captured at least one data item; and an output device, communicatively coupled to the storage device, configured to output the generated report.

12. The system of claim 11, wherein:

the third additional code is configured to cause the processor to capture a system time prior to execution of the stored procedure and a system time after execution of the stored procedure;

the processor is further configured to determine an execution time for the stored procedure based on the captured system times before and after execution of the stored procedure; and the generated report output by the output device comprises the determined execution time for the stored procedure.

13. The system of claim 11, wherein the processor is further configured to insert the first, the second, and the third additional code by inserting advices.

14. The system of claim 13, wherein the processor is further configured to insert the advices by performing load time weaving.

15. The system of claim 13, wherein the processor is further configured to insert the advices by:

establishing join points;

specifying advice code to run at the join points; and specifying when the advice code is to run with regard to execution of the call preparation function, the parameter setting function, and the call executing function.

16. The system of claim 15, wherein the processor is further configured to specify advice code to run at a join point of the join points by:

specifying a set of join points for which the advice code should be added;

determining whether the join point is a member of the specified set of join points; and responsive to the join point being a member of the specified set of join points, adding the advice code at the join point.

17. The system of claim 11, wherein the inserted third additional code captures at least one data item concerning a cross-cutting concern associated with the stored procedure.

18. The system of claim 11, wherein determining, in the processor, the association between the captured call signature, the captured parameter, and the captured at least one data item comprises determining that the captured call signature, the captured parameter, and the captured at least one data item are associated with a same thread; and wherein executing the call preparation function, the parameter setting function, and the call executing function occurs within the same thread.

19. The system of claim 18, wherein the first, the second, and the third additional code are configured to store the captured call signature, the captured parameter, and the captured at least one data item by storing the captured call signature, the captured parameter, and the captured at least one data item in a storage location inaccessible to other execution threads.

20. The system of claim 19, wherein the storage device is further configured to store the captured at least one data item by storing the captured at least one data item in a hash table associated with the same thread.

21. A computer program product for profiling a stored procedure, comprising:

a non-transitory computer-readable storage medium; and computer program code, encoded on the non-transitory computer-readable storage medium, configured to cause at least one processor to perform the steps of:

receiving an instruction to execute a call preparation function to prepare a call to invoke a stored procedure;

inserting first additional code to the call preparation function operable to capture a call signature of the stored procedure;

receiving an instruction to execute a parameter setting function to set a parameter for the stored procedure;

inserting second additional code to the parameter setting function operable to capture the parameter for the stored procedure;

receiving an instruction to execute a call executing function operable to invoke the stored procedure with the parameter for the stored procedure;

inserting third additional code to the call executing function operable to capture at least one data item concerning the stored procedure;

executing the call preparation function, the parameter setting function, and the call executing function, including executing the first, the second, and the third additional code to capture the call signature, the parameter, and the at least one data item, respectively, concerning the stored procedure;

causing a storage device to store the captured call signature, the captured parameter, and the captured at least one data item;

determining an association between the captured call signature, the captured parameter, and the captured at least one data item;

generating a report profiling the stored procedure based on the captured call signature, the captured parameter, and the captured at least one data item; and causing an output device to output the generated report.

22. The computer program product of claim 21, wherein:

the third additional code is configured to cause the at least one processor to capture a system time prior to execution of the stored procedure and a system time after execution of the stored procedure;

the computer program product further comprising computer program code configured to cause the at least one processor to determine an execution time for the stored procedure based on the captured system times before and after execution of the stored procedure; and the generated report comprises the determined execution time for the stored procedure.

23. The computer program product of claim 21, wherein the computer program code configured to cause the at least one processor to insert the first, the second, and the third additional code comprises computer program code configured to cause the at least one processor to insert advices.

24. The computer program product of claim 23, wherein the computer program code configured to cause the at least one processor to insert the advices comprises computer program code configured to cause the at least one processor to perform load time weaving to insert the advices.

25. The computer program product of claim 23, wherein the computer program code configured to cause the at least one processor to insert the advices comprises computer program code configured to cause the at least one processor to perform the steps of:

establishing join points;

specifying advice code to run at the join points; and specifying when the advice code is to run with regard to execution of the call preparation function, the parameter setting function, and the call executing function.

26. The computer program product of claim 25, wherein the computer program code configured to cause the at least one processor to specify advice code to run at a join point of the joint points comprises computer program code configured to cause the at least one processor to perform the steps of:

specifying a set of join points for which the advice code should be added;

determining whether the join point is a member of the specified set of join points; and responsive to the join point being a member of the specified set of join points, adding the advice code at the join point.

27. The computer program product of claim 21, wherein the inserted third additional code captures at least one data item concerning a cross-cutting concern associated with the stored procedure.

28. The computer program product of claim 21, wherein the call preparation function, the parameter setting function, and the call executing function are associated with an execution thread in a multi-threaded environment, and wherein the computer program code configured to cause the storage device to store the captured call signature, the captured parameter, and the captured at least one data item comprises computer program code configured to cause the storage device to store the captured call signature, the captured parameter, and the captured at least one data item in a storage location associated with the execution thread.

29. The computer program product of claim 28, wherein the computer program code configured to cause the storage device to store the captured call signature, the captured parameter, and the captured at least one data item comprises computer program code configured to cause the storage device to store the captured call signature, the captured parameter, and the captured at least one data item in a storage location inaccessible to other execution threads.

30. The computer program product of claim 21, wherein the computer program code configured to cause the storage device to store the captured at least one data item comprises computer program code configured to cause the storage device to store the captured at least one data item in a hash table.

* * * * *

UNITED STATES PATENT AND TRADEMARK OFFICE
CERTIFICATE OF CORRECTION

| | | |
|---|---|---|
| PATENT NO. | : 8,656,367 B1 | Page 1 of 1 |
| APPLICATION NO. | : 13/179796 | |
| DATED | : February 18, 2014 | |
| INVENTOR(S) | : Rakesh Sharma | |

It is certified that error appears in the above-identified patent and that said Letters Patent is hereby corrected as shown below:

In the Claims

Column 26, lines 18-23, Claim 30 should read

30. The computer program product of claim 21, wherein the computer program code configured to cause the storage device to store the captured at least one data item comprises computer program code configured to cause the storage device to store the captured at least one data item in a hash table <u>associated with the execution thread</u>.

Signed and Sealed this
Second Day of December, 2014

Michelle K. Lee
*Deputy Director of the United States Patent and Trademark Office*